US007572755B2

(12) United States Patent
Miller et al.

(10) Patent No.: US 7,572,755 B2
(45) Date of Patent: Aug. 11, 2009

(54) DRILLING FLUID COMPRISING A VINYL NEODECANOATE POLYMER AND METHOD FOR ENHANCED SUSPENSION

(75) Inventors: Jeff Miller, Tomball, TX (US); Jeff Kirsner, Humble, TX (US)

(73) Assignee: Halliburton Energy Services, Inc., Ducan, OK (US)

( * ) Notice: Subject to any disclaimer, the term of this patent is extended or adjusted under 35 U.S.C. 154(b) by 112 days.

(21) Appl. No.: 10/656,684

(22) Filed: Sep. 5, 2003

(65) Prior Publication Data

US 2004/0043905 A1    Mar. 4, 2004

Related U.S. Application Data

(63) Continuation-in-part of application No. 10/292,124, filed on Nov. 12, 2002, now Pat. No. 7,456,135, which is a continuation-in-part of application No. 10/175,272, filed on Jun. 19, 2002, now Pat. No. 6,887,832, which is a continuation-in-part of application No. 09/929,465, filed on Aug. 14, 2001, now abandoned, and a continuation-in-part of application No. PCT/US00/35609, filed on Dec. 29, 2000, and a continuation-in-part of application No. PCT/US00/35610, filed on Dec. 29, 2000.

(51) Int. Cl.
*C09K 8/12* (2006.01)
*E21B 21/14* (2006.01)

(52) U.S. Cl. .................. 507/119; 507/118; 507/925

(58) Field of Classification Search ............. 507/119, 507/118, 925
See application file for complete search history.

(56) References Cited

U.S. PATENT DOCUMENTS

| | | | |
|---|---|---|---|
| 2,816,073 A | 12/1957 | Stratton | 252/8.5 |
| 3,684,012 A | 8/1972 | Scheffel et al. | 166/283 |
| 3,878,110 A | 4/1975 | Miller et al. | |
| 3,878,117 A | 4/1975 | Williams et al. | 252/47 |
| 3,894,980 A * | 7/1975 | DeTommaso | 524/558 |
| 3,912,683 A | 10/1975 | O'Farrell | 260/29.7 |
| 3,954,627 A | 5/1976 | Dreher et al. | 252/8.5 P |
| 3,988,246 A | 10/1976 | Hartfiel | 252/8.5 A |
| 4,007,149 A | 2/1977 | Burton et al. | 260/29.7 |
| 4,012,329 A | 3/1977 | Hayes et al. | 252/8.5 P |
| 4,142,595 A | 3/1979 | Anderson et al. | |
| 4,148,821 A | 4/1979 | Nussbaum et al. | 260/505 S |
| 4,151,096 A | 4/1979 | Jackson | 252/8.5 A |
| 4,153,588 A | 5/1979 | Makowski et al. | 260/23.5 |
| 4,240,915 A | 12/1980 | Block | 252/8.5 B |
| 4,255,268 A | 3/1981 | Block | 252/8.5 B |
| 4,264,455 A | 4/1981 | Block | 252/8.5 B |
| 4,366,070 A | 12/1982 | Block | 252/8.5 A |
| 4,390,474 A | 6/1983 | Nussbaum et al. | 260/505 R |
| 4,422,947 A | 12/1983 | Dorsey et al. | 252/8.5 C |
| 4,425,462 A | 1/1984 | Turner et al. | 524/400 |
| 4,428,845 A | 1/1984 | Block | 252/8.5 A |
| 4,447,338 A | 5/1984 | Lundberg et al. | 252/8.5 M |
| 4,473,479 A | 9/1984 | Block | 252/8.5 A |
| 4,488,975 A | 12/1984 | Almond | 252/8.55 R |
| 4,508,628 A | 4/1985 | Walker et al. | 252/8.5 |
| 4,552,215 A | 11/1985 | Almond et al. | 166/278 |
| 4,553,601 A | 11/1985 | Almond et al. | 166/308 |
| 4,559,233 A | 12/1985 | Chen et al. | 426/104 |
| 4,619,772 A | 10/1986 | Black et al. | 252/8.514 |
| 4,670,501 A * | 6/1987 | Dymond et al. | 524/458 |
| 4,671,883 A | 6/1987 | Connell et al. | 252/8.515 |
| 4,777,200 A * | 10/1988 | Dymond et al. | 524/458 |
| 4,784,990 A | 11/1988 | Boyd | 252/8.511 |
| 4,802,998 A | 2/1989 | Mueller et al. | 252/8.514 |
| 4,810,355 A | 3/1989 | Hopkins | 208/58 |
| 4,900,456 A | 2/1990 | Ogilvy | 252/8.551 |
| 4,964,615 A | 10/1990 | Mueller et al. | 507/243 |
| 5,045,219 A | 9/1991 | Trahan et al. | 252/8.51 |
| 5,106,516 A | 4/1992 | Mueller et al. | 507/138 |
| 5,189,012 A | 2/1993 | Patel et al. | 507/103 |
| 5,232,910 A | 8/1993 | Mueller et al. | 507/138 |
| 5,237,080 A | 8/1993 | Daute et al. | 554/213 |
| 5,252,554 A | 10/1993 | Mueller et al. | 507/138 |
| 5,254,531 A | 10/1993 | Mueller et al. | 507/131 |
| 5,308,401 A | 5/1994 | Geke et al. | 134/2 |
| 5,318,954 A | 6/1994 | Mueller et al. | 507/138 |
| 5,318,955 A | 6/1994 | Mueller et al. | 507/139 |
| 5,318,956 A | 6/1994 | Mueller et al. | 507/139 |
| 5,330,662 A | 7/1994 | Jahnke et al. | 252/8.551 |
| 5,333,698 A | 8/1994 | Van Slyke | 175/63 |
| 5,382,290 A | 1/1995 | Nahm et al. | |
| 5,403,508 A | 4/1995 | Reng et al. | |
| 5,403,822 A | 4/1995 | Mueller et al. | 507/138 |

(Continued)

FOREIGN PATENT DOCUMENTS

AU          B-75043/94          3/1995

(Continued)

OTHER PUBLICATIONS

Litigation Documents regarding related U.S. Appl. No. 6,887,832 B2, issued May 3, 2005, being filed herewith in accord with MPEP 2001.06(c).

(Continued)

*Primary Examiner*—Timothy J. Kugel
(74) *Attorney, Agent, or Firm*—Craig W. Roddy; Karen B. Tripp

(57) ABSTRACT

An efficient oil based drilling fluid is provided that includes a polymer additive effective at imparting suspension characteristics without the presence of organophilic clays, while also providing filtration control. The fluid is shear thinning and has good fluid rheology over a broad temperature range. A preferred polymer for the additive is substantially linear and comprises mostly hydrophobic monomers and some hydrophilic monomers such as, for example, an emulsion copolymer of 2-ethylhexyl acrylate and acrylic acid.

22 Claims, 1 Drawing Sheet

U.S. PATENT DOCUMENTS

| | | | | |
|---|---|---|---|---|
| 5,407,909 | A | 4/1995 | Goodhue, Jr. et al. | 507/118 |
| 5,432,152 | A | 7/1995 | Dawson et al. | 507/103 |
| 5,441,927 | A | 8/1995 | Mueller et al. | 507/138 |
| 5,451,641 | A * | 9/1995 | Eisenhart et al. | 525/301 |
| 5,498,596 | A | 3/1996 | Ashjian et al. | 507/103 |
| 5,508,258 | A | 4/1996 | Mueller et al. | 507/135 |
| 5,552,462 | A | 9/1996 | Yeh | 524/55 |
| 5,569,642 | A | 10/1996 | Lin | 507/103 |
| 5,589,442 | A | 12/1996 | Gee et al. | 507/103 |
| 5,591,699 | A | 1/1997 | Hodge | 507/213 |
| 5,605,879 | A | 2/1997 | Halliday et al. | 507/103 |
| 5,607,901 | A | 3/1997 | Toups, Jr. et al. | 507/103 |
| 5,620,946 | A | 4/1997 | Jahnke | |
| 5,635,457 | A | 6/1997 | Van Slyke | 507/103 |
| 5,744,677 | A | 4/1998 | Wu | 585/512 |
| 5,789,349 | A * | 8/1998 | Patel | 507/121 |
| 5,837,655 | A | 11/1998 | Halliday et al. | 507/103 |
| 5,846,913 | A | 12/1998 | Sawdon | 507/103 |
| 5,849,974 | A | 12/1998 | Clarembeau et al. | 585/668 |
| 5,851,958 | A | 12/1998 | Halliday et al. | 507/103 |
| RE36,066 | E | 1/1999 | Mueller et al. | 507/138 |
| 5,868,434 | A | 2/1999 | Mueller et al. | 507/110 |
| 5,869,434 | A | 2/1999 | Mueller et al. | 507/110 |
| 5,877,378 | A | 3/1999 | Overstreet et al. | 585/637 |
| 5,909,779 | A | 6/1999 | Patel et al. | 175/50 |
| 5,929,297 | A | 7/1999 | Theriot et al. | 585/525 |
| 5,958,845 | A | 9/1999 | Van Slyke | 507/103 |
| 6,001,790 | A | 12/1999 | Schmitt et al. | |
| 6,006,831 | A * | 12/1999 | Schlemmer et al. | 166/250.01 |
| 6,022,833 | A | 2/2000 | Mueller et al. | 507/203 |
| 6,034,037 | A | 3/2000 | Van Slyke | 507/103 |
| 6,090,754 | A | 7/2000 | Chan et al. | 507/110 |
| 6,107,255 | A | 8/2000 | Van Slyke | 507/103 |
| 6,110,874 | A | 8/2000 | Van Slyke | 507/103 |
| 6,165,946 | A | 12/2000 | Mueller et al. | 507/203 |
| 6,180,572 | B1 | 1/2001 | Mueller et al. | 507/209 |
| 6,204,224 | B1 | 3/2001 | Quintero et al. | 507/123 |
| 6,211,119 | B1 | 4/2001 | Herold et al. | 507/103 |
| 6,289,989 | B1 | 9/2001 | Mueller | |
| 6,451,953 | B1 | 9/2002 | Albright | 526/348 |
| 6,462,096 | B1 | 10/2002 | Dino et al. | |
| 6,515,031 | B2 | 2/2003 | Fefer | 516/73 |
| 6,831,042 | B2 * | 12/2004 | Ristol et al. | 507/120 |
| 2003/0064897 | A1 | 4/2003 | Kirsner et al. | 507/100 |
| 2003/0144153 | A1 | 7/2003 | Kirsner et al. | 507/100 |
| 2004/0102332 | A1 | 5/2004 | Thompson et al. | |
| 2004/0110642 | A1 | 6/2004 | Thompson et al. | |

FOREIGN PATENT DOCUMENTS

| | | |
|---|---|---|
| CA | 2 088 697 | 2/1992 |
| EP | 0 124 194 A2 | 11/1984 |
| EP | 0 247 801 A2 | 12/1987 |
| EP | 0 254 412 | 1/1988 |
| EP | 0 561 608 A | 9/1993 |
| EP | 1 111 024 A1 | 6/2001 |
| EP | 1424380 A1 | 6/2004 |
| GB | 2166782 A | 5/1986 |
| GB | 2212192 A | 7/1989 |
| GB | 2287052 | 3/1996 |
| GB | 2309204 A | 7/1997 |
| WO | WO 83/00249 | 9/1983 |
| WO | WO 83/02949 | 9/1983 |
| WO | WO 95/21225 | 8/1985 |
| WO | WO 98 23491 A | 11/1993 |
| WO | WO 94/16030 | 7/1994 |
| WO | WO 95/09215 | 4/1995 |
| WO | WO 95 26386 | 10/1995 |
| WO | WO 96 22342 | 7/1996 |
| WO | WO 98/18882 | 5/1998 |
| WO | WO 99 50370 A | 10/1999 |
| WO | WO 00 71241 A | 11/2000 |
| WO | WO 02/053675 A1 | 7/2002 |
| WO | WO 02/053676 A1 | 7/2002 |

OTHER PUBLICATIONS

"Neodol 1", "Neodol 1-9", "Neodol 135-3E", "Neodol 135-7E", "Neodol 23", "Neodol 23-1", "Neodol 23-1.1E", "Neodol 23-2.2E", "Neodol 23-2E", "Neodol 23-3", "Neodol 23-3E", "Neodol 23-6.5", "Neodol 23-6.5E", "Neodol 23E", "Neodol 25", "Neodol 25-2.5E", "Neodol 25-3", "Neodol 25-3E", "Neodol 25-7", "Neodol 25-7.E", "Neodol 45", "Neodol 45-4E", "Neodol 45E", "Neodol 79E", "Neodol 91", "Neodol 91.2.5E", "Neodol 91-5E", "Neodol 91-6E", "Neodol 91-8", "Neodol 91-8E", "Neodol 91E", "Neodol 25-9", "Neodol 25-9E", "Neodol 25E", "Neodol 45-5E", "Neodol 45-7 E", Product Data Sheets, Shell Chemicals, Retrieved from the internet: URL:http://www.shellchemicals.com/neodol, retrieved on Sep. 13, 2003, each data sheet comprising two pages.

"Altonic product sheet", Condea, 'Online! XP 002164097; Retrieved from the Internet: URL:http://www.condea.de/products/surfactanta/surfactanta_nonionic/alfonic.html, retrieved from the internet on Mar. 29, 2001, p. 1-p. 4.

"Tergitol NP9", "Tergitol 15-S-9", "Tergitol 15-S-7", "Tergitol NP-10", "Tergitol T1135", "Tergitol TMN-6", "Tergitol NP-4", "Tergitol 15 S 5", "Tergitol 15-S-12", "Tergitol T1260", "Tergitol NP-7", "Tergitol TMN-10", "Tergitol TMN-3", "Tergitol TMN 6", Tergitol 15-S-30, "Tergitol NP-40", retrieved from the internet on Sep. 13, 2003: http://www.sigmaaldrich.com/cgi-bin/hsrun/Distributed/HahtShop/HAHTpage/HS_CatalogSearch?Scope=NameSearch&Query=tergitol&Collection=rescatalog&CurPage=1,2.

Chapter 13, Synthetic, Baroid Fluids Handbook, Revised Aug. 1, 1997.

P.A. Boyd, D.L. Whitfill, T.S. Carter, and J.P. Allamon, New Base Oil Used in Low-Toxicity Oil Muds, 14 J. Petroleum Technology, 1985, pp. 937-942.

Friedheim, J.E., "Second-Generation Synthetic Drilling Fluids," SPE Distinguished Author Series: Dec. 1981-Dec. 1983.

David Power, Jim Friedheim and Bret Toups, M-I L.L.C., Flat Rheology SBM Shows Promise in Deepwater, Drilling Contractor, pp. 44-45 (May/Jun. 2003).

"Bio-Bore" (TM) Horizontal Directional Drilling Fluid Concentrate, Baroid Industrial Drilling Products data sheet (1995).

David D. Wilson, "Something New in Environmental Horizontal Installation," Inovations in Drilling, WWJ, Feb. 1996, pp. 27-28.

Daniel B. Oakley, "Environmental Horizontal Well Installation and Performance: Lessons Learned," Horizontal News, DOE Dept. of Technology Development, vol. 1, No. 2, Fall 1995, pp. 7 and 9.

Mac Seheult, Len Grebe II, J.E. Traweek, Jr., Mike Dudley, "Biopolymer Fluids Eliminate Horizontal Well Problems," World Oil, Jan. 1990, Gulf Publishing Co., Houston, Texas.

Bob Byrd, Mario Zamora, "Fluids are Key in Drilling Highly Deviated Wells," Petroleum Engineer International, pp. 24-26 (Feb. 1988).

Baroid Drilling Fluids Product Information Sheet on RM-63, Rheology Modifier (1990) (2 pages).

Baroid Drilling Fluids Product Data Sheets (1993) (121 pages).

Manual of Drilling Fluids Technology, Fundamental Characteristics of Drilling Fluids, NL Baroid/NL Industries, Inc. (1979) (22 pages).

Halliburton Drilling Fluids Technology—Introduction to Drilling, Dril-N & Completion Fluids.

Minute Entry for Markman Hearing Proceedings in Halliburton v. M-I, 6-05cv155, U.S. District Ct., Eastern District of Texas.

Transcript of Markman Hearing Before Hon. L. Davis in Halliburton v. M-I, 6-05cv155, U.S. District Ct., Eastern District of Texas.

Baroid's Environmentally Safe Fluids—Petrofree LV, Accolade (31 pages).

Baroid Drilling Fluids, Inc. brochure entitled "Petrofree™ The Biodegradable Solution for High-Performance Drilling," (1998) 8 pages.

A. Samuels, "H2S Need Not Be Deadly, Dangerous, Destructive," Soc. Petroleum Engineers, SPE 5202, (1974).

R.K. Clark, et al., "Polyacrylamide/Potassium-Chloride Mud for Drilling Water-Sensitive Shales," J Petroleum Tech. 719-729 SPE 5514 (Jun. 1976).

J.E. Friedheim, et al, "An Environmentally Superior Replacement for Mineral-Oil Drilling Fluids," 299-312, SPE 23062 (Sep. 3-6, 1991).

J.H. Rushing, et al., "Bioaccumulation from Mineral Oil-Wet and Synthetic Liquid-Wet Cuttings in an Estuarine Fish," 311-320, SPE 23350 (Nov. 10-14, 1991).

F.V. Jones, et al, "The Chronic Toxicity of Mineral Oil-Wet and Synthetic Liquid-Wet Cuttings on an Estuarine Fish, Fundulus grandis," 721-730, SPE 23497 (Nov. 10-13, 1991).

J.E. Friedheim, et al, "Superior Performance with Minimal Environmental Impact: A Novel Nonaqueous Drilling Fluid," 713-726, SPE 25753 (Feb. 23-25, 1993).

S. Park, et al., "The Success of Synthetic-Based Drilling Fluids Offshore Gulf of Mexico: A Field Comparison to Conventional Systems," 405-418, SPE 26354 (1993).

M. Slater, "Commonly Used Biodegradation Techniques for Drilling Fluid Chemicals, Are They Appropriate," 387-397, SPE/IADC 29376 (1995).

J. Candler, et al., "Seafloor Monitoring for Synthetic-Based Mud Discharged in the Western Gulf of Mexico," 51-69, SPE 29694 (1995).

J.E. Friedheim, et al, "Second Generation Synthetic Fluids in the North Sea: Are They Better?", 215-226, IADC/SPE 350061 (1996).

M.A. Legendre Zevallos, et al., "Synthetic-Based Fluids Enhance Environmental and Drilling Performance in Deepwater Locations," 235-242, SPE 35329 (1996).

E.A. Vik, et al, "Factors Affecting Methods for Biodegradation Testing of Drilling Fluids for Marine Discharge," 697-711, SPE 35981 (1996).

L. Bailey, et al., "Filtercake Integrity and Reservoir Damage," 111-120, SPE 39429, (1998).

P.A. Bern, et al., "Barite Sag: Measurement, Modeling and Management," IADC/SPE 47784 (9 pages) (1998).

N. Hands, et al., "Optimising Inflow Performance of a Long Multi-Lateral Offshore Well in Low Permeability Gas Bearing Sandstone: K14-FB 102 Case Study," SPE 50394 (1998) 14.

L. Xiao, et al., "Studies on the Damage Induced by Drilling Fluids in Limestone Cores," SPE 50711 (17 pages) (1999).

A. Meinhold, "Framework for a Comparative Environmental Assessment of Drilling Fluids Used Offshore," SPE 52746 (10 pages) (1999).

L.J. Fraser, et al., "Formation-Damaging Characteristics of Mixed Metal Hydroxide Drill-In Fluids and a Comparison with Polymer-Base Fluids," SPE 57714 (1999).

P.A. Bern, et al., "Barite Sag: Measurement, Modeling, and Management," SPE 62051, SPE Drill. & Completion 15(1) 25-30 (Mar. 2000).

A. Saasen, et al., "Prediction of Barite Sag Potential of Drilling Fluids from Rheological Measurements," SPE/IADC 29410 (Feb. 26-Mar. 2, 1995).

P.I. Reid, et al, "Field Evaluation of a Novel Inhibitive Water-Based Drilling Fluid for Tertiary Shales," SPE 24979 (Nov. 16-18, 1992).

W. Hite, et al, Better Practices and Synthetic Fluid Improve Drilling Rates, Oil & Gas J. Online (Feb. 20, 1995).

N. Hands, et al, "Drill-in Fluid Reduces Formation Damage, Increases Production Rates," Oil & Gas J. Online (1998).

J.P. Plank, "Water-Based Muds Using Synthetic Polymers Developed for High Temperature Drilling," Oil & Gas J. Online (1992).

Brookfield Instruction Manual for SSV Vane Standard Spindle Set.

Brookfield Press Release on Vane Spindles (Mar. 12, 2002), ThomasNet Product News Room.

EPA Development Document for Proposed Effluent Limitations Guidelines for Standards for Synthetic-Based Drilling Fluid and Other Non-Aqueous Drilling Fluids . . . (Feb. 1999).

Environmental Impacts of Synthetic Based Drilling Fluids, U.S. Dept of the Interior, Minerals Management Service, Aug. 2000.

EPA Environmental Assessment of Proposed Effluent Limitations Guidelines for Synthetic-Based Drilling Fluids and Other Non-Aqueous Drilling Fluids . . . (Feb. 1999).

"Horizontal Wells Offer Economic Advantage," Horizontal News, Fall 1996.

A. Saasen, et al, "Monitoring of Barite Sag Important in Deviated Drilling," Oil & Gas J. Online (1991).

Novadril (TM) System, MI Technology Report (1993).

G. Robinson et al, Novel Viscometer for Improved Drilling Fluid Characterization, Baker Hughes INTEQ (1996).

N.J. Alderman, et al, "Vane Rheometry of Bentonite Gels," 39 J. Non-Newtonian Fluid Mechanics 291-310 (1991).

API Recommended Practice Standard Procedure for Field Testing Oil-Based Drilling Fluids, API Rec. Prac. 13B—2, 3rd. ed. (Feb. 1998) American Petroleum Institute.

Depostion Transcript of David Carbajal, co-inventor of US 6,887,832, in Civil Action 6:05CV155, US Dist. Ct. (E.D. TX), Halliburton Energy Serv. v. M-I, LLC, (Jan. 12, 2006).

Deposition Transcript of Kimberly Burrows, co-inventor of US 6,887,832 in Civil Action 6:05CV155, US Dist. Ct. (E.D. TX), Halliburton Energy Serv. v. M-I, LLC, (Oct. 26, 2005).

Deposition Transcript of Don Siems, co-inventor of US 6,887,832 in Civil Action 6:05CV155, US Dist. Ct. (E.D. TX), Halliburton Energy Serv. v. M-I, LLC, (Dec. 12, 2005).

Deposition Transcript of Jeff Kirsner, co-inventor of US 6,887,832 in Civil Action 6:05CV155, US Dist. Ct. (E.D. TX), Halliburton Energy Serv. v. M-I, LLC, (Feb. 15, 2006).

Deposition Transcript of Karen Tripp, patent prosecuting attorney for US 6,887,832, CV 6:05CV155, US Dist. Ct. (E.D. TX), Halliburton Energy Serv. v. M-I, LLC, (Jan. 26, 2006).

First Amended Complaint, Civil Action No. 6:05CV155, U.S. Dist. Court, Eastern Dist. of Texas, Tyler Div., Halliburton Engery Services, Inc. v. M-I, LLC., filed Jan. 27, 1006.

M-I, LLC's 2nd Amended Answer, Affirmative Defenses, and Counterclaims, Civil Action No. 6:05CV155, U.S. Dist. Court, Eastern Dist. of Texas, Tyler Div., filed Feb. 10, 2006.

Plaintiff's Preliminary Infringement Contentions, Civil Action No. 6:05CV155, U.S. Dist. Court. Eastern Dist. of Texas, Halliburton Energy Services, Inc. v. M-I LLC, Sep. 16, 2005.

M-I, LLC's Preliminary Invalidity Contentions, CA No. 6:05CV155, U.S. Dist. Court, Eastern Dist. of Texas, Halliburton Energy Services, Inc. v. M-I, LLC, Oct. 28, 2005.

K. Burrows, et al., "New Low Viscosity Ester is Suitable for Drilling Fluids in Deepwater Applications," SPE 66553, Feb. 2001 (14 pages).

L.F. Nicora, "High-Density Invert-Emulsion System with Very Low Solids Content to Drill ERD and HPHT Wells," SPE 65000, Feb. 2001 (17 pages).

D. Eckhout, et al., "Development Process and Field Applications of a New Ester-based Mud System for ERD Wells on Australia's Northwest Shelf," IADC/SPE 62791 (Sep. 2002).

M. Mas, et al, "A New High-Temperature Oil-Based Drilling Fluid," SPE 53941, Venezuela Apr. 1999 (14 pages).

C. Cameron, et al, "Drilling Fluids Design and Management for Extended Reach Drilling," IADC/SPE 72290, Oct. 2001 (7 pages).

L. Knox, et al, "New Developments in Ester-based Mud Technology," AADE-02-DFWM-HO-41, Apr. 2002 (9 pages).

L.J. Fraser, "Field Application of the All-Oil Drilling Fluid," IADC/SPE 19955, Feb. 27-Mar. 2, 1990).

Halliburton's Proposed Terms and Claim Elements for Construction, CV 6.05CV155, US Dist. Ct. (E.D. TX), Halliburton Energy Serv. v. M-I, LLC, Nov. 21, 2005.

Defendant M-I, L.L.C.'s List of Disputed Claim Terms, Civil Action No. 6:05CV155, U.S. Dist. Court, (E.D. TX), Halliburton Energy Services, Inc. v. M-I LLC, Nov. 21, 2005.

Plaintiff's Preliminary Claim Constructions Pursuant to Local Patent Rule 4-2, CV 6.05CV155, US Dist. Ct. (E.D. TX), Halliburton Energy Serv. v. M-I, LLC, Dec. 23, 2005.

Defendant M-I, LLC's Preliminary Claim Construction and Identification of Extrinsic Evidence for U.S. Appl. No. 6,887,832, CV 6.05CV155, US Dist. Ct. (E.D. TX), Dec. 23, 2005.

Joint Claim Construction and Prehearing Statement Pursuant to P.R. 4-3, CV 6.05CV155, US Dist. Ct. (ED TX), Halliburton Energy Serv. v. M-I, LCC Jan. 20, 2006.

Defendant M-I, LLC's Motion for Summary Judgment of Invalidity with Respect to U.S. Appl. No. 6,887,832.

M-I LLC's Motion for Leave to Add Inequitable Conduct Defense to its Pleadings, CV 6.05CV155, U.S. Dist. Ct. (ED TX), Halliburton Energy Serv. v. M-I, LLC, Jan. 26, 2006.

Plaintiff's Initial Disclosures, Civil Action 6.05CV155, US Dist. Ct. (ED TX), Halliburton Energy Services, Inc. v. M-I, LLC, Sep. 16, 2005.

Plaintiff's Initial Disclosures, Civil Action 6.05CV155, US Dist. Ct. (ED TX), Halliburton Energy Services, Inc. v. M-I, LLC, Sep. 16, 2005.

Defendant M-I, LLC's Initial Disclosures, Civil Action 6.05CV155, US Dist. Ct. (ED TX), Halliburton Energy Services, Inc. v. M-I, LLC, Aug. 19, 2005.

Plaintiff Halliburton's Objections and Responses to Defendant M-I LLC's First Set of Requests for Production, Civil Action 6.05CV155, Halliburton v. MI, Aug. 26, 2005.

Plaintiff Halliburton's Objections and Responses to Defendant M-I LLC's First Set of Interrogatories, Civil Action 6.05CV155, Halliburton v. MI, Aug. 26, 2005.

Plaintiff Halliburton's Supplemental Responses and Objections to Defendant M-I LLC's First Set of Interrogatories, Civil Action 6.05CV155, Halliburton v. MI, Oct. 25, 2005.

M-I, LLC's Responses to Plaintiff's First Set of Interrogatories to Defendant (Nos. 1-21), Civil Action 6.05CV155, US Dist. Ct. (ED TX), Halliburton v. MI, Nov. 16, 2005.

Halliburton's Opening Brief on Claim Construction, Civil Action 6.05CV155, US Dist. Ct. (ED TX), Halliburton Energy Services, Inc. v. M-I, LLC, Mar. 17, 2006.

Halliburton's Unopposed Motion for Leave to Exceed Page Limit for its Markman Brief, CV 6.05CV155, US Dist. Ct., Halliburton Energy Services, Inc. v. M-I, LLC, Mar. 17, 2006.

Defendant M-I, LLC's Reply in Support of its Motion for Summary Judgment of Invalidity with Respect to U.S. Appl. No. 6,887,832 with exhibits.

M-I, LLC's Responsive Brief on the Construction of the Asserted Claims of U.S. Appl. No. 6,887,832 with exhibits.

Halliburton's Unopposed Motion for Leave to Exceed Page Limit for its Surreply in Opposition to M-I's Motion for Summary Judgment of Invalidity with the Surreply and other exh.

Halliburton's Unopposed Motion for Leave to Exceed Page Limit for Reply Brief on Claim Construction with the Reply Brief and other exhibits.

U.S. Court of Appeals for the Federal Circuit opinion of Jan. 25, 2008 in Halliburton Energy Services, Inc. v. M-I, LLC, 2007-1149, re U.S. Appl. No. 6,887,832 (21 pages).

Plaintiff-Appellant Halliburton's Petition for Panel Rehearing and Rehearing En Banc, Halliburton v. M-I, Appeal 2007-1149, Federal Circuit, filed Feb. 22, 2008, with addendum.

Order of the Federal Circuit denying rehearing and rehearing en banc in 2007-1149 concerning U.S. Appl. No. 6,887,832 (2 pages).

Halliburton's Notice of Dismissal (of lawsuit) with Prejudice in U.S. Dist. Ct (Eastern Dist of Tx) Civ. Action No.6:07-cv-469 concerning U.S. Appl. No. 7,278,485 (3 pages).

M-I, LLC & Halliburton Agreed Motion to Voluntarily Dismiss U.S. Dist Ct (Eastern Dist of Tx) Civ. Action No. 6:07-CV-311 (2 pages).

Order of the US Dist. Ct for the Eastern District of TX, Tyler, dismissing with prejudice Civ. Action No. 6:07-CV-311 (1 page).

* cited by examiner

DRILLING FLUID COMPRISING A VINYL NEODECANOATE POLYMER AND METHOD FOR ENHANCED SUSPENSION

RELATED APPLICATION

This application is a continuation-in-part of U.S. patent application Ser. No. 10/292,124, of Jeff Kirsner, et al., filed Nov. 12, 2002, and entitled "Invert Drilling Fluids and Methods of Drilling Boreholes", issued as U.S. Pat. No. 7,456,135, on Nov. 25, 2008, which is a continuation-in-part of U.S. patent application Ser. No. 10/175,272, filed Jun. 19, 2002, issued as U.S. Pat. No. 6,887,832, on May 3, 2005, which is a continuation-in-part of U.S. patent application Ser. No. 09/929,465, filed Aug. 14, 2001, abandoned, and International Patent Application Nos. PCT/US00/35609 and PCT/US00/35610, both filed Dec. 29, 2000, and having entered national phase in the United States and respectively now issued as U.S. Pat. No. 7,435,706 and pending as U.S. patent application Ser. No. 10/432,786, the content of each of which is incorporated herein by reference.

BACKGROUND OF THE INVENTION

1. Field of the Invention

The present invention relates to compositions and methods for drilling boreholes in subterranean formations, particularly hydrocarbon bearing formations, and to drilling fluids for use in such drilling operations. More particularly, the present invention relates to oil and synthetic fluid based drilling fluids comprising invert emulsions, and drilling fluid additives that enhance suspension characteristics of such drilling fluids.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation. As used herein, the term "drilling fluid" shall be understood to include fluids used in drilling, and/or cementing, casing and/or other completion operations downhole.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.") holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such fluids shall be understood to comprise invert emulsions. As used herein, the term "synthetic fluid" has the meaning generally known and used by the oil and gas drilling industry. Generally, the term "synthetic fluid" means a material produced by the chemical reaction of specific purified chemical feedstock as opposed to traditional base fluids such as diesel and mineral oil which are derived from crude oil solely through physical separation processes, e.g., fractionation, distillation, and minor processes such as cracking and hydroprocessing.

Oil-based muds and synthetic-fluid based muds used in drilling typically comprise: a base oil or synthetic fluid comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 (5$^{th}$ ed. 1988). An invert emulsion-based drilling fluid may commonly comprise between about 50:50 to about 95:5 by volume oil phase to water phase, or synthetic fluid phase to water phase. An all oil mud simply comprises 100% liquid phase oil by volume; that is, there is no aqueous internal phase.

Invert emulsion-based muds or drilling fluids (also called invert drilling muds or invert muds or fluids) comprise a key segment of the drilling fluids industry. However, increasingly invert emulsion-based drilling fluids have been subjected to greater environmental restrictions and performance and cost demands. With space at some well sites limited, such as on offshore platforms, and with increasing costs of transport of materials to a wellsite, there is industry wide interest in, and on-going need for, more efficient drilling fluid additives and for drilling fluids which can be formulated and maintained with minimal or fewer additives than common with prior art drilling fluids, while still affording environmental and economical acceptance.

SUMMARY OF THE INVENTION

An improved and more efficient invert emulsion based drilling fluid and method are disclosed for use in drilling boreholes in subterranean formations, particularly hydrocarbon bearing formations.

The drilling fluid of the invention comprises a polymer additive that imparts favorable suspension characteristics and shear thinning viscosity to the drilling fluid without unduly or excessively enhancing the viscosity of the fluid. That is, the present invention provides a drilling fluid with improved suspension characteristics (or properties) that has not been "thickened" (i.e., had its viscosity increased) to the point that the equivalent circulating density (ECD) of the fluid has been negatively or detrimentally increased.

Moreover, the polymer additive is particularly advantageous when applied according to the preferred method of the invention because the additive generally eliminates the need for two other additives commonly used in drilling fluids—fluid loss or filtration control additives and clays. This advantage of the present invention is particularly appreciated for use with offshore wells where only limited or relatively little space is available on offshore platforms for storage of drilling fluid components. The polymer additive itself imparts fluid loss control to the drilling fluid of the invention in addition to providing suspension characteristics. Moreover, the additive imparts suspension characteristics to the drilling fluid without the addition of or presence of organophilic clays (also called "organo-clays") so commonly used and traditionally believed by the oil and gas drilling industry to be necessary for suspension of drill cuttings. Thus, a drilling fluid of the invention is not dependent on organophilic clays to obtain suspension of drill cuttings. Any characterization of the drilling fluid herein as "clayless" shall be understood to mean lacking organophilic clays. Further, the rheological properties of the drilling fluid of the invention remain stable over a broad temperature range even after exposure to high temperatures.

Another advantage of the present invention is the ability the invention affords to formulate and use such a useful, serviceable and efficient fluid that meets stringent environmental compatibility restrictions commonly found in sensitive environmental zones such as the Gulf of Mexico.

A drilling fluid of the invention may be generally identified by reference to laboratory tests measuring suspension characteristics of a fluid, such as Stress Build Index (SBI) (or Stress Build Function), Gel Progression Index (GPI), and yield stress (or Tau zero or Tau 0) used in calculating SBI. These tests are generally conducted as described herein on laboratory-mud fluids. Generally, a laboratory prepared fluid of the present invention as measured at 120° F. will have a preferred yield stress of less than about 15, an SBI in the preferred range of about 1 to about 2, and a GPI in the preferred range of about 0 to about 10, indicating progressive gel behavior. A drilling fluid of the invention also indicates good filtration control in a high temperature, high pressure (HTHP) test.

Although the invention is characterized primarily through identifying characteristics or features of a synthetic fluid-based drilling fluid that has suspension characteristics approximating or approaching those of an aqueous-based drilling fluid containing xanthan gum, it is believed that the advantages of the present invention may be realized with a polymer additive that is preferably a co-polymer or terpolymer, comprising mostly hydrophobic monomers with a smaller amount of hydrophilic monomers. To be considered hydrophilic, the monomer should generally have a solubility of above about 3% by weight in water at room temperature, and to be considered hydrophobic, the monomer should generally have a solubility of below about 3% by weight in water at room temperature (about 20° C.). The polymer preferably should be substantially linear and substantially free of aromatic hydrocarbons. In one embodiment, the polymer contains about 40 to about 100% by weight $C_{6-10}$ alkyl acrylate. A most preferred polymer for comprising the additive of the invention is the emulsion copolymer of 2-ethylhexyl acrylate and acrylic acid in about a 99:1 ratio, although ratios with higher quantities of acrylic acid have been found effective. For example, 85:15 (2-ethylhexyl acrylate to acrylic acid) has been found acceptable even at temperatures as high as about 350° F.

Any oil or synthetic fluid base suitable for comprising a drilling fluid or for use in a drilling fluid may be used in the drilling fluid of the invention.

The methods of the invention provide or employ the improved drilling fluids of the invention for improved drilling of boreholes in subterranean formations.

DETAILED DESCRIPTION OF PREFERRED EMBODIMENTS

Figure 1:
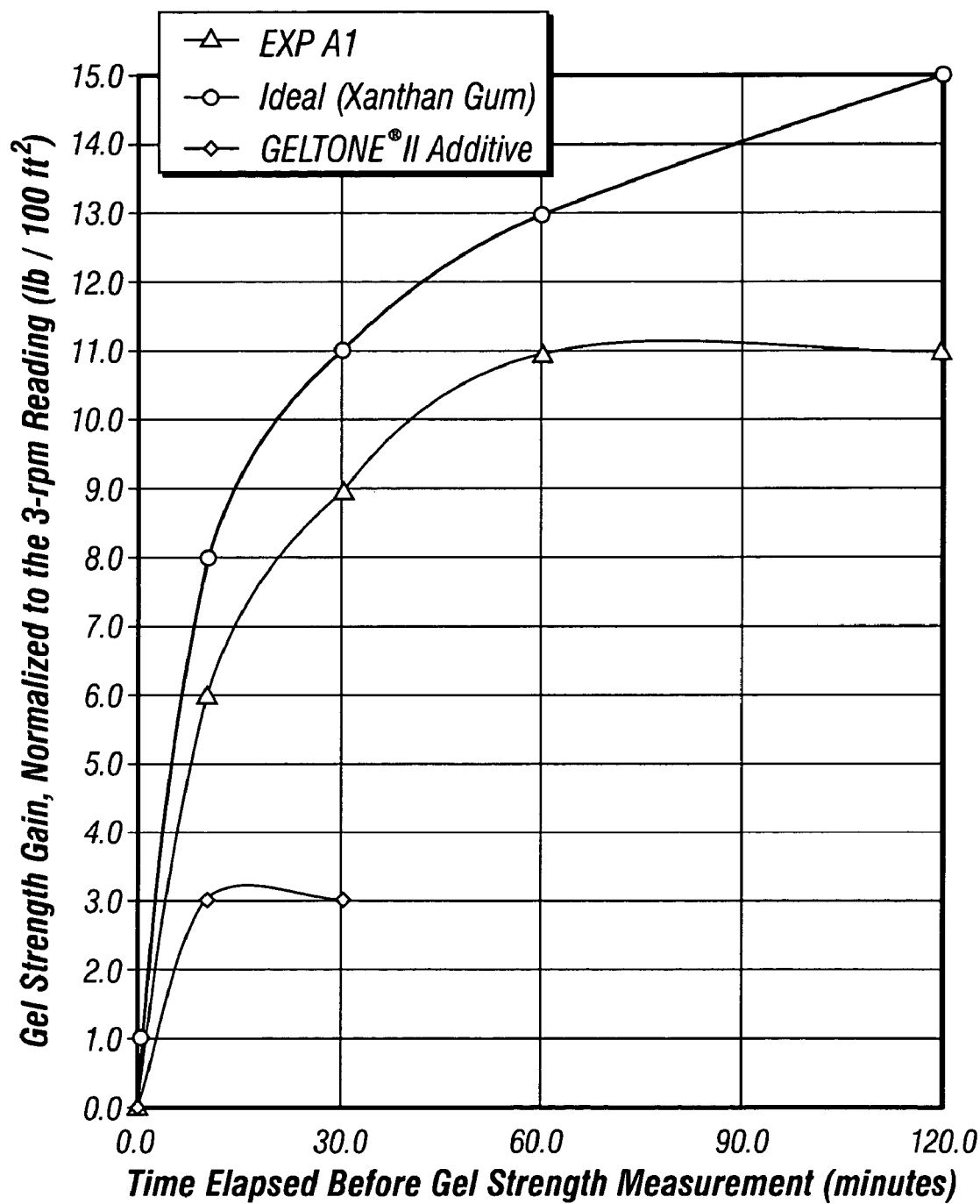
FIG. 1 is a graph comparing the gel strength over time of three different fluids, one being an example fluid of the invention, one being an aqueous fluid thickened with xanthan gum, and one being a synthetic fluid containing organoclays.

The drilling fluid of the present invention is an oil- or synthetic fluid-based invert emulsion drilling fluid comprising a polymer additive whose effects in the drilling fluid rival those of xanthan gum in an aqueous based fluid. That is, the drilling fluid of the invention provides excellent suspension of weight material and drill cuttings, shear-thinning viscosity, and highly progressive gellation. The fluid also provides good filtration control as measured by a high temperature, high pressure (HTHP) test. Moreover, the properties of the fluid remain stable after exposure to high temperatures. The fluid also does not generally require additives to alter the fluid's cold-temperature properties.

When formulated as preferred, the drilling fluid of the invention is efficient and relatively simple, comprising fewer components than typical of commercially available oil or synthetic fluid-based drilling fluids. This characteristic allows the fluid of the invention to be economical and particularly favored for use in offshore wells, where offshore platforms have only limited or relatively little space for storing drilling fluid components. That is, when formulated as preferred, the drilling fluid of the invention may comprise as few components as a synthetic fluid base and an aqueous solution for making the invert emulsion, one or more emulsifiers, an optional neutralizing agent such as lime, the polymer additive of the invention, and weighting agents. See Tables 4, 5 and 6.

The drilling fluid of the invention preferably has as its base one or more environmentally acceptable oil or synthetic fluids, such as, for example, the esters, olefins, paraffins, and ester blends taught in United States Patent Application Publication No. 2003/0036484, of Jeff Kirsner, et al., published Feb. 20, 2003, and incorporated herein by reference. Olefins and paraffins are generally preferred for best performance according to the invention. Examples of preferred commercially available synthetic fluids suitable for the base of the drilling fluids of the present invention are LE BASE™, and SF BASE™, both available from Halliburton Energy Services, Inc. in Houston, Tex. However, the particular drilling fluid base selected will depend at least in part on the intended location of use of the fluid. Selection criteria for a base fluid include, for example, any government environmental compatibility restrictions, as well as considerations related to subterranean formation characteristics (e.g., temperatures, depths, types of formation clays, etc.), physical location of the well on or off shore, and costs. For example, in the Gulf of Mexico, only certain fluids meet standards provided by the United States government for use in drilling offshore wells and so the base fluid for purposes of the present invention must be such a fluid if planned for use in the Gulf of Mexico.

The drilling fluid of the invention generally does not need viscosifiers or additional suspension agents and generally does not need or require for its effectiveness fluid loss control agents or filtration control additives. This characteristic applies over a broad temperature range, and is particularly applicable at temperatures as low as about 40° F., a typical temperature encountered in deepwater offshore operations or in cold climates, as well as at higher temperatures, such as 120° F., as demonstrated by test data discussed below. The fluid has been found to have acceptable characteristics at temperatures as low as 32° F. and as high as 350° F. and is believed to be effective at even higher temperatures. The polymer additive of the invention imparts suspension characteristics to the fluid and also imparts fluid loss control. Further, the drilling fluid of the invention does not generally exhibit problematic sag.

Laboratory tests may be used to distinguish drilling fluids of the invention from clay-suspended (i.e., traditional) fluids. The tests discussed here were conducted with laboratory prepared fluids having a volume ratio of synthetic fluid to water of about 70:30, 75:25, 80:20, or 85:15. Other ratios, although less common, could also be used. The tests include yield stress, Stress Build Index (SBI) (or Stress Build Function), and Gel Progression Index (GPI) or how well the gel strength increases over time. The SBI and GPI values are indicative of suspension capabilities and the value for yield stress (Tau zero) is used in determining the SBI. The tests results should indicate progressive gel behavior.

Yield stress (Tau zero) is the torque required to just start a system moving from rest. This point is selected for measurement because low shear rates remove inertial effects from the measurement and thus enable a truer measure of yield stress than measurements taken at other points. Generally, laboratory prepared drilling fluids of the present invention at these laboratory conditions/specifications will have a yield stress of less than about 15, preferably less than about 10, with variances depending on the fluids used for the oil or synthetic base and the particular polymer additive of the invention.

SBI indicates structure building tendencies normalized for initial yield stress (Tau zero). SBI also effectively normalizes for mud weight, since generally higher weight fluids have higher Tau zero values. Tau zero is related to SBI by the following equation:

$$SBI = (10 \text{ minute gel strength} - \text{Tau zero})/\text{Tau zero}$$

where SBI is the measure of how much gel structure is built in ten minutes relative to the yield stress or Tau zero. A FANN® 35 viscometer, a standard six speed oilfield rheometer, was used in measuring SBI in the experiments discussed below, but other rheometers may be used. Generally, laboratory prepared drilling fluids of the present invention will have a SBI (or SBF10m) of greater than 1 as measured at 120° F., and preferably an SBI in the range of about 1 to about 2.

GPI, i.e., a measure of how well the gel strength increases over a ten-minute time interval, is calculated in accordance with the following equation:

$$GPI = (10 \text{ minute gel strength}/10 \text{ second gel strength}) - 1$$

Generally, laboratory prepared drilling fluids of the present invention will have a GPI of about 0.6 or greater, or preferably in the range of about 0.5 to about 2, as measured at 120° F. Guidelines for measuring such 10 minute gel strength (and similar 10 second gel strength, measured in the same manner as the 10 minute gel strength except over a smaller period of time) are provided in American Petroleum Institute (API) Specification 13B-2, Section 4.3, Third Edition, February 1998.

Field-based fluids (as opposed to laboratory fluids or muds) may yield varying results in the laboratory tests above because of the presence of other fluids, subterranean formation conditions, etc. While some organo-clay may enter the fluids in the field, for example, due to mixing of recycled fluids with the fluids of the invention, the fluids of the invention are tolerant of such clay in low quantities. The fluids of the invention, however, are expected to behave more like traditional drilling fluids when organo-clays are present in quantities approaching those typical of traditional drilling fluids comprising organo-clays for suspension characteristics. That is, the advantages of the present invention become reduced or lost upon the addition of such significant quantities of organo-clays. In the test examples below, GELTONE® II additive used is a common organo-clay.

A preferred polymer additive of the invention, called "EXP A1" in the test data discussed below, is an emulsion copolymer of 2-ethylhexyl acrylate and acrylic acid, prepared as described in U.S. Pat. No. 4,670,501, issued Jun. 2, 1987 to Dymond et al., and a continuation-in-part of that patent, U.S. Pat. No. 4,777,200, issued Oct. 11, 1988 to Dymond et al., both of which are incorporated herein by reference (the Dymond patents). A formulation having a 2-ethylhexyl acrylate to acrylic acid ratio of about 99:1 is most preferred, although other ratios may be used, provided that the quantity of hydrophobic monomers on the polymer exceed the quantity of hydrophilic monomers. At very high temperatures, such as about 300° F. to about 350° F. or higher, it is likely that some acrylate will hydrolyze to acrylic acid, raising the content of acrylic acid in the ratio. Ratios as high in acrylic acid as 15%, for example, 85:15 2-ethylhexyl acrylate to acrylic acid, have been found acceptable at these temperatures. See Table 7 discussed further below. Alternatively, vinyl neodecanoate may be effectively substituted for 2-ethylhexyl acrylate in formulating the polymer for the present invention.

Although such Dymond polymers may be generally useful as polymer additives in the present invention, the present invention is not limited to the use of such polymers and some of such polymers may perform significantly better according to the present invention than others. Key to ascertaining polymer additive(s) suitable for the present invention are the results of laboratory tests measuring suspension characteristics imparted by the polymer to samples of laboratory prepared drilling fluids formulated without organo-clays according to the present invention.

The Dymond patents teach polymeric compositions for thickening "water-immiscible liquid," and that particularly good thickening effects may be achieved when inorganic particulate solids such as organophilic bentonite or other clays are added to the liquid.

In contrast, the present invention is directed not to "thickening" fluids but to enhancing the suspension characteristics of drilling fluid without significantly "thickening" the fluid, or more specifically, without increasing the viscosity of the fluid such that the fluid's equivalent circulating density increases significantly downhole.

Moreover, notwithstanding the teaching of the Dymond patents and the accepted and customary practice in the industry that advantages may be achieved by including organophilic bentonite and other clays with the polymers, the present invention unexpectedly provides a formulation that yields superior results in enhancing the suspension characteristics of an oil- or synthetic fluid-based drilling fluid without such clays. Further, the formulation of the invention achieves these superior results without causing undue viscosity while also providing shear-thinning properties. Additionally, as previously noted, the present invention provides a drilling fluid that achieves superior rheology without need for filtration control additives or fluid loss control additives, notwithstanding the use of such additives in the teachings of the Dymond patents.

The advantages of the present invention are demonstrated by the test data below.

Experimental

An experiment was conducted to compare a drilling fluid formulated according to the teachings of the Dymond patents (Sample "A") with an example drilling fluid formulated according to the present invention (Sample "B") using mineral oil, the base used in Sample "A" according to the teachings of the Dymond patents. That is, specifically, the recipe for a drilling fluid of Example 3 in the Dymond patents was used for Sample "A." Sample "B" was similarly prepared but without fluid loss control agent. Both Samples "A" and "B" were prepared without clays. The Dymond patents failed to specify temperature(s) used so temperatures typical for offshore wells, where the present invention is particularly advantageous, were used. Both samples had an active polymer content of 40%, as 12.5 lb/bbl of polymer yields 5 pounds per barrel active polymer in this experiment. The formulations and the rheological properties of the samples are shown in Table 1.

TABLE 1

(12.1 lb/gal Fluids; 79/21 OWR with 220,000 ppm WPS)

| Sample | Blank | A | B |
|---|---|---|---|
| HDF-2000 ™ light mineral oil, bbl | 0.640 | 0.640 | 0.640 |
| Freshwater, bbl | 0.085 | 0.085 | 0.085 |
| 11.6 lb/gal CaCl$_2$ brine, bbl | 0.087 | 0.087 | 0.087 |
| EZ MUL NT ™ emulsifer, lb | 7 | 7 | 7 |
| DURATONE ® HT fluid loss agent, lb | 10 | 10 | — |
| Lime, lb | 5 | 5 | 5 |
| DRILTREAT ™ wetting agent, lb | 1 | 1 | 1 |
| BAROID ® weighting agent, lb | 243 | 243 | 243 |
| EXP Al polymer, lb | — | 12.5 | 12.5 |
| After adding EXP Al polymer, the samples were mixed 30 minutes | | | |
| Temperature, ° F. | 120 | 40 | 120 | 40 | 120 |
| Plastic Viscosity, cP | 16* | 105* | 33 | 69 | 29 |
| Yield Point, lb/100 ft$^2$ | 1 | 81 | 17 | 25 | 24 |
| 10 Sec gel, lb/100 ft$^2$ | 2 | 18 | 8 | 7 | 10 |
| 10 Min gel, lb/100 ft$^2$ | 2 | 18 | 16 | 11 | 24 |
| 30 Min gel, lb/100 ft$^2$ | — | 19 | 20 | 15 | 26 |
| Electrical stability, v | 411 | — | 924 | — | 810 |
| HTHP filtrate @ 250° F., ml | — | 1.0 | | 3.8 | |
| FANN ® 35 Viscometer Dial Readings | | | | | |
| 600 rpm | 33 | 291 | 83 | 163 | 82 |
| 300 rpm | 17 | 186 | 50 | 94 | 53 |
| 200 rpm | 13 | 142 | 39 | 69 | 43 |
| 100 rpm | 7 | 90 | 26 | 41 | 30 |
| 6 rpm | 1 | 22 | 9 | 9 | 11 |
| 3 rpm | 1 | 18 | 8 | 7 | 10 |
| Tau zero, lb/100 ft$^2$ | 0.3 | 10.3 | 7.3 | 5.4 | 8.2 |
| n (flow index) | 0.91 | 0.69 | 0.80 | 0.83 | 0.70 |
| K (consistency index) | 0.06 | 2.45 | 0.31 | 0.53 | 0.62 |
| GPI | 0.0 | 0.0 | 1.0 | 0.6 | 1.4 |
| SBI | 6.4 | 0.8 | 1.2 | 1.0 | 1.9 |

*Indicates settling of barite observed after measuring properties. Sample A had some fluid solidifying while measuring properties at 40° F. All trademarked products are available from Halliburton Energy Services, Inc. unless indicated otherwise herein.

The test data in Table 1 indicates that Sample "B," an example fluid of the present invention prepared with mineral oil (as used in the Dymond patents) instead of preferred synthetic fluid, had acceptable filtration properties as measured by the high temperature, high pressure filtrate (HTHP) test at 250° F., without inclusion of a fluid loss control agent in the formulation. HTHP filtrate values of 1.0 ml (Sample "A") and 3.8 ml (Sample "B") are both low values for this test, which indicates that both samples would provide effective control of fluid loss to the formation. However, at lower temperatures (40° F.), Sample "A" was too viscous to be used effectively as a drilling fluid, whereas Sample "B" showed excellent properties at both temperatures tested (40° F. and 120° F.). Moreover, the Tau zero value and the GPI and SBI values for Sample "B" were higher at 120° F. than for Sample "A." Additionally, the consistency index, K, for Sample "A" at 40° F. was excessive, while the value for Sample "B" at 40° F. was low, even slightly lower than the consistency value for Sample "B" at 120° F.

Thus, this test data demonstrates that even mineral oil-based invert emulsion drilling fluids prepared according to the present invention performed superior to the drilling fluids taught by the Dymond patents.

Additional experiments are reported in Tables 2 and 3, showing formulations and rheological properties for samples prepared like Sample "B" of Table 1 but with more refined oil or synthetic fluids preferred according to the present invention rather than with mineral oil. This data indicates the advantages of the present invention as discussed above.

TABLE 2

(12.1 lb/gal Fluids; 79/21 OWR with 220,000 ppm WPS)

| Sample | C | D |
|---|---|---|
| SF BASE ™ fluid, bbl (C$_{16}$/C$_{18}$ Internal Olefin) | 0.640 | — |
| PETROFREE ® LV fluid, bbl (Ester) | — | 0.640 |
| Freshwater, bbl | 0.085 | 0.085 |
| 11.6 lb/gal CaCl$_2$ brine, bbl | 0.087 | 0.087 |
| EZ MUL NT ™ emulsifier, lb | 7 | 7 |
| Lime, lb | 5 | 5 |
| DRILTREAT ™ wetting agent, lb | 1 | 1 |
| BAROID ® weighting agent, lb | 243 | 243 |
| EXP Al polymer, lb | 12.5 | 12.5 |
| After adding EXP A1 polymer, the samples were mixed 30 minutes | | |
| Temperature, ° F. | 40 | 120 | 40 | 120 |
| Plastic Viscosity, cP | 52 | 25 | 73 | 31 |
| Yield Point, lb/100 ft$^2$ | 27 | 22 | 50 | 39 |
| 10 Sec gel, lb/100 ft$^2$ | 9 | 9 | 30 | 16 |
| 10 Min gel, lb/100 ft$^2$ | 10 | 20 | 39 | 29 |
| 30 Min gel, lb/100 ft$^2$ | 13 | 23 | 41 | 33 |
| Electrical stability, v | — | 795 | — | 1035 |
| HTHP filtrate @ 250° F., ml | — | 3.6 | — | 2.6 |
| FANN ® 35 Viscometer Dial Readings | | | | |
| 600 rpm | 131 | 72 | 196 | 101 |
| 300 rpm | 79 | 47 | 123 | 70 |
| 200 rpm | 60 | 38 | 95 | 57 |
| 100 rpm | 39 | 27 | 67 | 42 |
| 6 rpm | 11 | 10 | 33 | 18 |
| 3 rpm | 9 | 9 | 29 | 16 |
| Tau zero, lb/100 ft$^2$ | 7.6 | 7.4 | 29.4 | 13.3 |
| n (flow index) | 0.78 | 0.69 | 0.84 | 0.63 |
| K (consistency index) | 0.58 | 0.58 | 0.51 | 1.15 |
| GPI | 0.1 | 1.2 | 0.3 | 0.8 |
| SBI | 0.3 | 1.7 | 0.3 | 1.2 |

All trademarked products are available from Halliburton Energy Services, Inc. in Houston, Texas unless indicated otherwise herein.

TABLE 3

(12.1 lb/gal Fluids; 79/21 OWR with 220,000 ppm WPS)

| Sample Mark | E | F |
|---|---|---|
| ACCOLADE BASE ™ fluid, bbl (Ester/Olefin blend) | 0.640 | — |
| SF BASE ™ fluid, bbl (C$_{16}$/C$_{18}$ Internal Olefin) | — | 0.320 |
| XP-07 ™ fluid, bbl (C$_{13}$-C$_{15}$ Paraffin) | — | 0.320 |
| Freshwater, bbl | 0.085 | 0.085 |
| 11.6 lb/gal CaCl$_2$ brine, bbl | 0.087 | 0.087 |
| EZ MUL NT ™ emulsifier, lb | 7 | 7 |
| Lime, lb | 5 | 5 |
| DRILTREAT ™ wetting agent, lb | 1 | 1 |
| BAROID ® weighting agent, lb | 243 | 243 |
| EXP Al polymer, lb | 12.5 | 12.5 |
| After adding EXP A1 polymer, the samples were mixed 30 minutes: | | |
| Temperature, ° F. | 40 | 120 | 40 | 120 |
| Plastic Viscosity, Cp | 75 | 33 | 46 | 23 |
| Yield Point, lb/100 ft$^2$ | 74 | 37 | 18 | 20 |
| 10 Sec gel, lb/100 ft$^2$ | 31 | 16 | 7 | 8 |
| 10 Min gel, lb/100 ft$^2$ | 36 | 26 | 11 | 18 |
| 30 Min gel, lb/100 ft$^2$ | 37 | 29 | 14 | 20 |
| Electrical stability, v | — | 995 | — | 767 |
| HTHP filtrate @ 250° F., ml | — | 2.8 | — | 4.4 |
| FANN ® 35 Viscometer Dial Readings | | | | |
| 600 rpm | 224 | 103 | 110 | 66 |
| 300 rpm | 149 | 70 | 64 | 43 |

TABLE 3-continued (12.1 lb/gal Fluids; 79/21 OWR with 220,000 ppm WPS)

| Sample Mark | | | E | F |
|---|---|---|---|---|
| 200 rpm | 119 | 57 | 47 | 35 |
| 100 rpm | 84 | 42 | 30 | 24 |
| 6 rpm | 35 | 18 | 8 | 9 |
| 3 rpm | 30 | 16 | 7 | 8 |
| Tau zero, lb/100 ft$^2$ | 26.1 | 13.9 | 6.0 | 6.6 |
| n (flow index) | 0.69 | 0.66 | 0.84 | 0.69 |
| K (consistency index) | 1.73 | 0.97 | 0.33 | 0.52 |
| GPI | 0.2 | 0.6 | 0.6 | 1.3 |
| SBI | 0.4 | 0.9 | 0.9 | 1.7 |

All trademarked products are available from Halliburton Energy Services, Inc. in Houston, Texas unless indicated otherwise herein.

Tables 4, 5, and 6 show the fluid formulations and Theological properties of fluid samples in a further experiment conducted comparing the suspension characteristics imparted by xanthan gum in an aqueous fluid (Sample "0") to the suspension characteristics imparted by organoclays in a synthetic fluid invert emulsion based fluid (Samples "1" and "3") and to the suspension characteristics imparted by a preferred polymer additive of the present invention, EXP A1, in a synthetic fluid invert emulsion based fluid (Samples "2", "4", and "5"). This data indicates that the fluids of the present invention yield superior results to clays in synthetic fluid invert emulsion fluids and that the fluids of the invention approximate or come close to the effectiveness seen with xanthan in aqueous fluids. FIG. 1 further compares these three types of fluids by graphing their respective gel strengths over time. Progressive gel behavior is seen with the xanthan gum and with EXP A1 polymer for the initial hour but not to any significant degree when the GELTONE® II clay additive is used.

TABLE 4

(14.0 lb/gal Fluids; 80/20 OWR with 250,000 ppm WPS)

| Sample | 0* | 1 | 2 |
|---|---|---|---|
| LE BASE ™ oil, bbl | — | 0.552 | 0.552 |
| LE MUL ™ emulsifier, lb | — | 3 | 3 |
| LE SUPERMUL ™ emulsifier, lb | — | 7 | 7 |
| Lime, lb | — | 5 | 5 |
| Freshwater, bbl | — | 0.071 | 0.071 |
| 11.6 lb/gal CaCl$_2$ brine, bbl | — | 0.088 | 0.088 |
| Rev Dust, lb | — | 20 | 20 |
| The additives above were blended into a premix. | | | |
| GELTONE ® II organoclay, lb | — | 6 | — |
| EXP A1 polymer, lb | — | — | 7.5 |
| The viscosity additive was mixed into aliquots of premix. | | | |
| BAROID ® weighting agent, lb | — | 330 | 330 |
| After adding weighting agent and mixing for 30 minutes, the samples were hot rolled at 150° F. for 16 hrs. | | | |
| Properties measured after hot rolling: | | | |
| Temperature, ° F. | | 120 | |
| Plastic viscosity, cP | 16 | 25 | 30 |
| Yield point, lb/100 ft$^2$ | 22 | 16 | 19 |
| 10 sec gel strength, lb/100 ft$^2$ | 8 | 10 | 6 |
| 10 min gel strength, lb/100 ft$^2$ | 16 | 13 | 9 |
| 30 min gel strength, lb/100 ft$^2$ | 20 | 12 | 11 |
| Electrical stability, v | — | 984 | 707 |
| FANN ® 35 viscometer dial readings: | | | |
| 600 rpm | 54 | 66 | 79 |
| 300 rpm | 38 | 41 | 49 |
| 200 rpm | 33 | 33 | 38 |
| 100 rpm | 25 | 24 | 26 |
| 6 rpm | 9 | 11 | 8 |
| 3 rpm | 7 | 10 | 6 |

TABLE 4-continued (14.0 lb/gal Fluids; 80/20 OWR with 250,000 ppm WPS)

| Sample | 0* | 1 | 2 |
|---|---|---|---|
| Tau zero, lb/100 ft$^2$ | 4.2 | 9.9 | 5.3 |
| n (flow index) | 0.51 | 0.82 | 0.74 |
| K (consistency index) | 1.49 | 0.21 | 0.47 |
| GPI | 1.0 | 0.3 | 0.5 |
| SBI | 2.8 | 0.3 | 0.7 |

*Sample "0" was not an oil-based fluid but had an equivalent density to the other samples. Sample "0" consisted of 0.776 bbl freshwater, 1 lb/bbl BARAZAN D PLUS ™ xanthan gum viscosifier, 20 lb/bbl Rev Dust, 294 lb/bbl BAROID ® weighting agent, and 0.5 lb/bbl BARABUF ™ fluid.

TABLE 5

(14.0 lb/gal Fluids; 80/20 OWR with 250,000 ppm WPS)

| Sample | 3 | 4 |
|---|---|---|
| LE BASE ™ oil, bbl | 0.552 | 0.552 |
| LE MUL ™ emulsifier, lb | 3 | 3 |
| LE SUPERMUL ™ emulsifier, lb | 7 | 7 |
| Lime, lb | 5 | 5 |
| Freshwater, bbl | 0.071 | 0.071 |
| 11.6 lb/gal CaCl$_2$ brine, bbl | 0.088 | 0.088 |
| Rev Dust, lb | 20 | 20 |
| GELTONE ® II organoclay, lb | 6 | — |
| EXP A1 polymer, lb | — | 7.5 |
| BAROID ® weighting agent, lb | 330 | 330 |
| Observations after static aging: | | |
| Top oil separation, inches | 0.4 | 0.3 |
| Settling apparent? (Yes/No) | Yes, slight | No |
| Properties measured after mixing for 10 minutes: | | |
| Temperature, ° F. | | 120 |
| Plastic viscosity, cP | 23 | 33 |
| Yield point, lb/100 ft$^2$ | 11 | 16 |
| 10 sec gel strength, lb/100 ft$^2$ | 7 | 10 |
| 10 min gel strength, lb/100 ft$^2$ | 10 | 16 |
| 30 min gel strength, lb/100 ft$^2$ | 10 | 17 |
| Electrical stability, v | 855 | 697 |
| HTHP filtrate @ 250° F./500 psid, mL | 13.6 | 2.8 |
| FANN ® 35 viscometer dial readings: | | |
| 600 rpm | 57 | 82 |
| 300 rpm | 34 | 49 |
| 200 rpm | 27 | 39 |
| 100 rpm | 19 | 26 |
| 6 rpm | 8 | 10 |
| 3 rpm | 7 | 9 |
| Tau zero, lb/100 ft$^2$ | 7.1 | 8.6 |
| n (flow index) | 0.85 | 0.83 |
| K (consistency index) | 0.14 | 0.25 |
| GPI | 0.4 | 0.6 |
| SBI | 0.4 | 0.9 |

TABLE 6

(14.0 lb/gal Fluid; 80/20 OWR with 250,000 ppm WPS)

| Sample | 5 |
|---|---|
| XP-07 ™ oil, bbl | 0.552 |
| LE MUL ™ emulsifier, lb | 3 |
| LE SUPERMUL ™ emulsifier, lb | 7 |
| Lime, lb | 5 |
| Freshwater, bbl | 0.071 |
| 11.6 lb/gal CaCl$_2$ brine, bbl | 0.088 |
| Rev Dust, lb | 20 |
| EXP A1 polymer, lb | 10 |

TABLE 6-continued (14.0 lb/gal Fluid; 80/20 OWR with 250,000 ppm WPS)

| Sample | 5 |
|---|---|
| BAROID ® weighting agent, lb | 330 |
| Properties Measured After Hot Rolling for 16 Hours and Mixing for 10 Minutes: | |
| Temperature, ° F. | 40 120 |
| Plastic viscosity, cP | 85 35 |
| Yield point, lb/100 ft$^2$ | 26 28 |
| 10 sec gel strength, lb/100 ft$^2$ | 8 10 |
| 10 min gel strength, lb/100 ft$^2$ | 15 21 |
| Electrical stability, v | — 1001 |
| HTHP filtrate @ 250° F./500 psid, mL | 1.6 |
| FANN ® 35 viscometer dial readings: | |
| 600 rpm | 196 98 |
| 300 rpm | 111 63 |
| 200 rpm | 80 50 |
| 100 rpm | 47 35 |
| 6 rpm | 9 11 |
| 3 rpm | 8 10 |
| Tau zero, lb/100 ft$^2$ | 5.4 7.4 |
| n (flow index) | 0.85 0.69 |
| K (consistency index) | 0.54 0.82 |
| GPI | 0.9 1.1 |
| SBI | 1.8 1.9 |

TABLE 7

PETROFREE ® SF Drilling Fluids

| Sample Mark | B4 | B5 | B6 | B7 | B8 |
|---|---|---|---|---|---|
| Mud density, lb/gal | 12 | 12 | 16 | 16 | 9.7 |
| Oil-to-Water Ratio | 70/30 | 70/30 | 85/15 | 85/15 | 75/25 |
| SF BASE ™ fluid, bbl | 0.544 | 0.547 | 0.520 | 0.520 | 0.618 |
| Freshwater, bbl | 0.118 | 0.111 | 0.042 | 0.042 | 0.100 |
| GELTONE ® II organo-clay, lb | 1.5 | — | — | — | — |
| SUSPENTONE ™ additive, lb | 1.5 | — | — | — | — |
| FACTANT ™ emulsifier, lb | 3.5 | 3.5 | — | 4 | — |
| LE MUL ™ emulsifier, lb | — | — | 4 | — | 4 |
| LE SUPERMUL ™ emulsifier, lb | 2 | 2 | 8 | 8 | 8 |
| 11.6 lb/gal CaCl$_2$ brine, bbl | 0.146 | 0.138 | 0.052 | 0.052 | 0.123 |
| Lime, lb | 8 | 8 | 5 | 8 | 5 |
| ADAPTA ® filtration control agent, lb | — | — | 2.5 | 3.0 | — |
| BARACARB ® 5 additive, lb | — | — | 5 | 5 | 5 |
| BAROID ® weighting agent, lb | 205.2 | 208.0 | 440.6 | 440.6 | 107 |
| Rev Dust, lb | 20 | 20 | 20 | 20 | 20 |
| COLDTROL ™ additive, lb | 1.0 | — | — | — | — |
| EXP Al polymer, lb | — | 8 | 5 | 4 | 13 |
| X-VIS ™ additive, lb | — | — | — | 0.5 | — |
| Hot rolled @ 150° F., hr | 16 | 16 | 16 | — | 16 | — | 16 | — | — |
| Hot rolled @ 300° F., hr | — | — | — | 16 | — | — | — | — | — |
| Hot rolled @ 350° F., hr | — | — | — | — | — | 16 | — | — | — |
| Static aged @ 250° F., hr | — | — | — | — | — | — | — | — | 16 |
| Samples were mixed 15 minutes on a Multimixer before testing | | | | | |
| Temperature, ° F. | 120 | 120 | 120 | 120 | 150 | 150 | 120 | 40 | 120 |
| Plastic viscosity, cP | 21 | 28 | 46 | 46 | 39 | 38 | 27 | 67 | 30 |
| Yield point, lb/100 ft$^2$ | 11 | 6 | 22 | 31 | 14 | 9 | 18 | 25 | 24 |
| 10 Sec gel, lb/100 ft$^2$ | 6 | 4 | 8 | 11 | 8 | 7 | 6 | 9 | 11 |
| 10 Min gel, lb/100 ft$^2$ | 7 | 7 | 11 | 18 | 18 | 12 | — | 14 | 20 |
| 30 Min gel, lb/100 ft$^2$ | 7 | 6 | 12 | 21 | 18 | 14 | — | 16 | 22 |
| Electrical stability, v | 234 | 211 | 1071 | 1642 | 1779 | 1008 | 725 | — | 600 |
| HTHP filtrate @ 250° F., ml | — | — | — | — | — | — | — | — | 1.2 |
| HTHP filtrate @ 300° F., ml | — | — | 5.8 | 6.8 | — | — | — | — | — |
| HTHP filtrate @ 350° F., ml | — | — | — | — | 6.0 | 16.8 | — | — | — |
| FANN ® 35 dial readings | | | | | | | | | |
| 600 rpm | 53 | 62 | 114 | 123 | 92 | 85 | 72 | 159 | 84 |
| 300 rpm | 32 | 34 | 68 | 77 | 53 | 47 | 45 | 92 | 54 |
| 200 rpm | 25 | 25 | 52 | 60 | 40 | 35 | 35 | 67 | 42 |
| 100 rpm | 16 | 16 | 34 | 39 | 25 | 21 | 23 | 41 | 29 |
| 6 rpm | 6 | 5 | 9 | 13 | 8 | 6 | 7 | 11 | 12 |
| 3 rpm | 5 | 4 | 8 | 11 | 7 | 5 | 6 | 9 | 11 |
| Tau zero, lb/100 ft$^2$ | 4.8 | 4.2 | 6.3 | 9.3 | 6.5 | 4.8 | 4.8 | 7.8 | 9.8 |
| n (flow index) | 0.81 | 0.93 | 0.78 | 0.75 | 0.87 | 0.91 | 0.73 | 0.85 | 0.76 |
| K (consistency index) | 0.18 | 0.10 | 0.50 | 0.68 | 0.23 | 0.16 | 0.44 | 0.44 | 0.41 |
| GPI | 0.2 | 0.8 | 0.4 | 0.6 | 1.3 | 0.7 | — | 0.6 | 0.8 |
| SBI | 0.5 | 0.7 | 0.7 | 1.0 | 1.8 | 1.5 | — | 0.8 | 1.0 |

In Table 7, Samples "B4" and "B5" investigated the possibility of using FACTANT™ emulsifier as the primary emulsifier for the system. These samples indicated that the product of the invention can be used with other emulsifiers and with fewer components than conventional systems or traditional drilling fluids. Samples "B6" & "B7" were hot rolled at 300 or 350° F. The properties in Sample "B6" were shown to be stable at 300° F., as a small amount of fluid loss control agent—ADAPTA™ filtration control agent—helped provide a low HTHP filtrate before and after hot rolling, indicating good HTHP filtration. The rheological properties and gel strengths for Sample "B7" were stable after hot rolling at 350° F., in spite of the fact that some of the 2-ethylhexyl acrylate had been hydrolyzed because of the high temperature. More fluid loss control agent is needed at 350° F. Sample "B8" was a very simple system, having few components, with EXP A1 polymer effectively alone providing excellent properties to the drilling fluid at 250° F. No settling was observed in Sample "B8" after aging, and only a trace of top oil was apparent. Sample "B8" was also very stable at 250° F. Overall, this data further supports the effectiveness of the invention. All trademarked products in the tables above and EXP A1 are available from Halliburton Energy Services, Inc. in Houston, Tex.

The foregoing description of the invention is intended to be a description of preferred embodiments. Various changes in the details of the described fluids and methods of use can be made without departing from the intended scope of this invention as defined by the appended claims.

What is claimed is:

1. A method for improving suspension characteristics of a drilling fluid, said method comprising adding to said drilling fluid a substantially linear polymer comprising mostly polar hydrophobic monomers and a smaller amount of hydrophilic monomers, and wherein said polymer comprises vinyl neodecanoate, such that said drilling fluid shows progressive gel behavior.

2. The method of claim 1 wherein a laboratory prepared sample of said fluid comprising said polymer has a Stress Build Index in the range of about 1 to about 2 at 120° F.

3. The method of claim 1 wherein a laboratory prepared sample of said fluid comprising said polymer has a Gel Progression Index in the range of about 0.3 to about 10 at 120° F.

4. The method of claim 1 wherein a laboratory prepared sample of said fluid comprising said polymer has a Gel Progression Index in the range of about 0.3 to about 7 at 120° F.

5. The method of claim 1 wherein a laboratory prepared sample of said fluid comprising said polymer has a Gel Progression Index in the range of about 0.6 to about 2 at 120° F.

6. The method of claim 1 wherein said improved suspension characteristics are obtained without the addition of organoclays to said drilling fluid.

7. The method of claim 1 wherein said polymer enhances fluid loss control without the addition of a fluid loss control additive.

8. The method of claim 1 wherein said polymer provides filtration control to the drilling fluid without the addition of a filtration control additive.

9. A method of drilling in a subterranean formation comprising: drilling a borehole in said subterranean formation and employing in said drilling a synthetic invert emulsion based drilling fluid that uses a polymer comprising mostly polar hydrophobic monomers and a smaller amount of hydrophilic monomers, wherein said polymer comprises vinyl neodecanoate, to provide said drilling fluid with suspension characteristics for suspending weighting agent, and wherein said drilling fluid can demonstrate progressive gel behavior.

10. The method of claim 9 wherein said polymer also imparts fluid loss control to said drilling fluid.

11. The method of claim 9 wherein said drilling fluid is formulated without the addition of organophilic clays.

12. The method of claim 9 wherein a laboratory prepared sample of said drilling fluid has a Stress Build Index in the range of about 1 to about 2 at 120° F.

13. The method of claim 9 wherein a laboratory prepared sample of said drilling fluid has a Gel Progression Index in the range of about 0.6 to about 2 at 120° F.

14. The method of claim 9 wherein said polymer also imparts filtration control to said drilling fluid.

15. The method of claim 9 wherein said polymer further provides said drilling fluid with suspension characteristics for suspending drill cuttings.

16. A drilling fluid consisting essentially of:
   a synthetic fluid invert emulsion base;
   water or brine;
   at least one emulsifier;
   weighting agent; and
   a substantially linear polymer comprising mostly polar hydrophobic monomers and a smaller amount of hydrophilic monomers wherein said polymer contains vinyl neodecanoate.

17. The drilling fluid of claim 16 wherein said polymer contains about 40 to about 99% by weight $C_{6-10}$ alkyl acrylate.

18. The drilling fluid of claim 16 wherein said polymer contains at least about 0.1% acrylic acid.

19. A method for drilling in a subterranean hydrocarbon bearing formation, said method comprising drilling a borehole in said formation and employing in said drilling a drilling fluid consisting essentially of:
   a synthetic fluid invert emulsion base;
   water or brine;
   at least one emulsifier;
   weighting agent; and
   a substantially linear polymer comprising mostly polar hydrophobic monomers and a smaller amount of hydrophilic monomers wherein said polymer contains vinyl neodecanoate.

20. The method of claim 19 further comprising at least one step from the group consisting of:
   completing said wellbore; and
   producing fluid from said wellbore.

21. The method of claim 20 wherein said step of completing said wellbore comprises cementing and casing said wellbore.

22. The method of claim 20 wherein said step of completing said wellbore comprises gravel packing said wellbore.

* * * * *